Jan. 27, 1925.

O. BALLERT

DUMPING TRUCK

Filed July 22, 1922

Inventor:
Otto Ballert
By ~~~
Attorney.

Jan. 27, 1925.
O. BALLERT
DUMPING TRUCK
Filed July 22, 1922
1,524,229
2 Sheets—Sheet 2
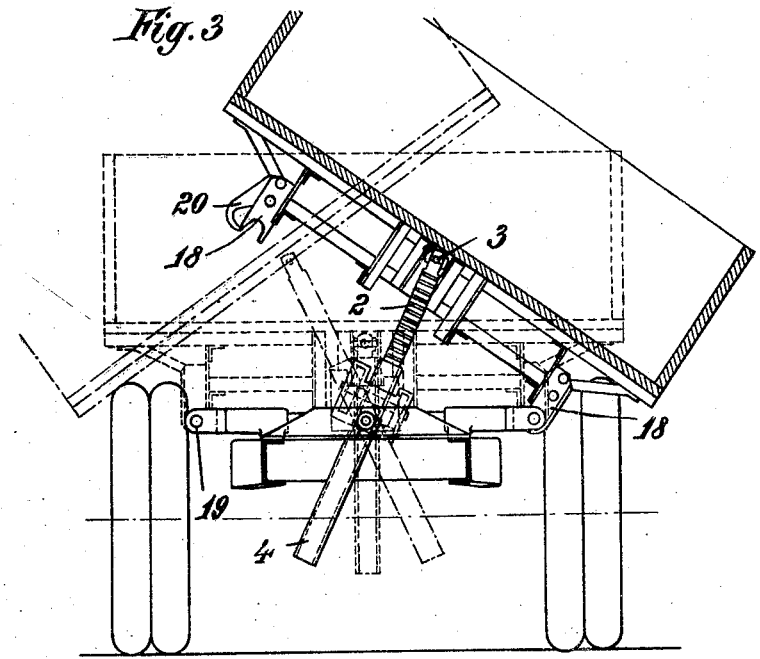
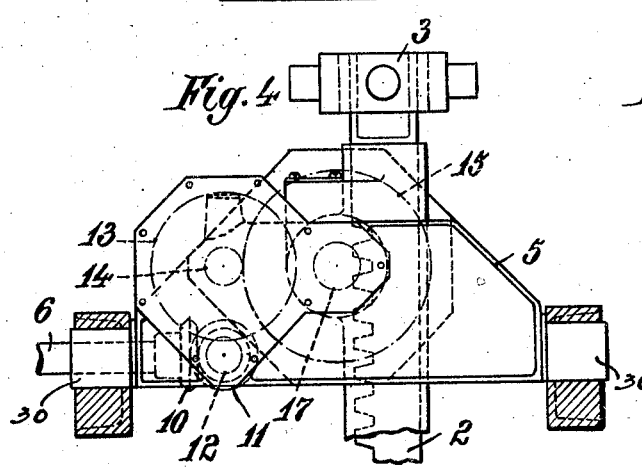
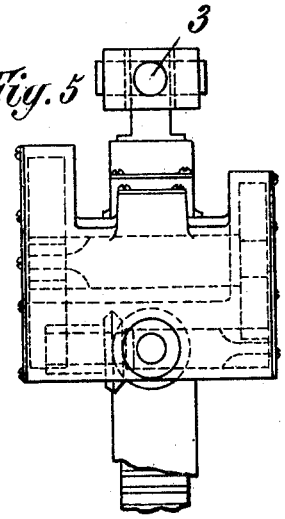
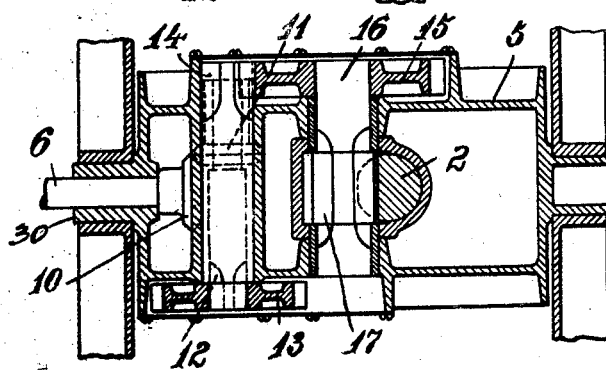
Inventor:
Otto Ballert
by [signature]
Attorney.

Patented Jan. 27, 1925.

1,524,229

UNITED STATES PATENT OFFICE.

OTTO BALLERT, OF BERLIN, GERMANY.

DUMPING TRUCK.

Application filed July 22, 1922. Serial No. 576,836.

*To all whom it may concern:*

Be it known that I, OTTO BALLERT, a citizen of Germany, residing at Berlin, Germany, have invented certain new and useful Improvements in Dumping Trucks, of which the following is a specification.

My invention refers to dumping trucks and more especially to a tilting device for use in connection with such trucks, this device belonging to the kind of tilting devices which permit discharging the contents of the wagon either at one end or to either side of the wagon.

In the dumping truck according to the present invention a toothed wheel hoisting device is disposed below the wagon box, this hoisting device being arranged to rock as a whole when discharging sideways about an axis extending in parallel to the longitudinal axis of the wagon.

In the drawings affixed to this specification and forming part thereof a dumping truck embodying my invention is illustrated by way of example.

Referring more particularly to the several figures of the drawing,

Figure 3 shows the motor truck seen from the rear with the car box in the lateral tilting position.

Figure 1:
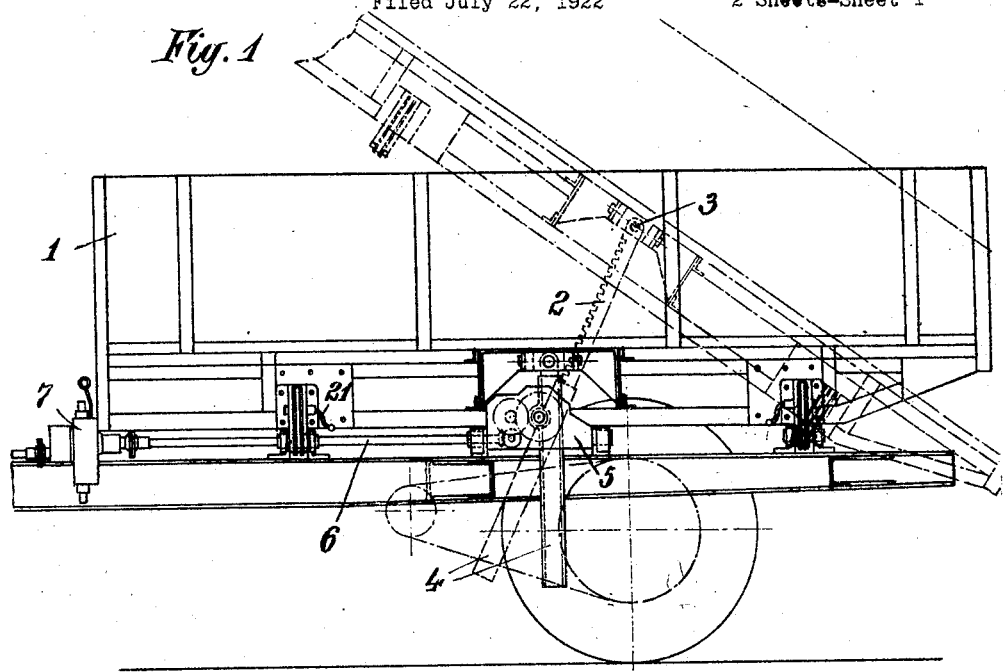
Figure 1 shows a motor truck with the car box in side view, the rearward tilting position being shown in dotted lines.
Figure 2:
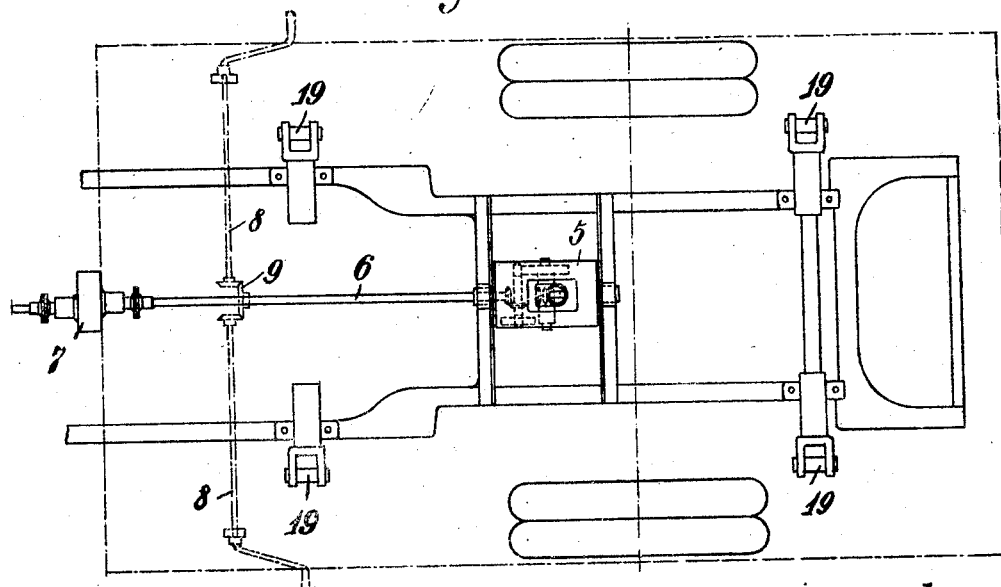
Figure 2 shows the motor truck in plan view with the car box removed.

In Figures 4 to 6 the driving mechanism of the hoisting means is shown on an enlarged scale, Figure 4 being a side view, Figure 5 a front view and Figure 6 a plan view, partly in section.

The car box 1 of the motor truck is tiltable both to the rear as well as laterally to the right or left. In the middle part and below the center of gravity of the car box the jack 2 is operatively applied which is provided with a Cardanic head 3. The rack bar 2 of the jack is guided in a rack bar casing 4 which is oscillatingly suspended in a separate casing 5 especially provided for this driving mechanism, which casing may be rockingly mounted in the vehicle frame, so as to cause the casing 5 and the housing 4 to rock substantially at right angle to each other. The driving shaft for the operating mechanism of the jack is situated below the middle part of the car box, and is indicated at 6. The operation of the driving shaft 6 of this operating mechanism is effected by special disengageable coupling means 7 from the motor engine or by means of hand operated cranks 8, shown in dotted lines, and by the medium of conical intermediary gears 9. At the end of the driving shaft 6 a bevel gear wheel 10 (Figures 4 and 6) is provided meshing with a corresponding gear wheel 11 in the gear casing. On the shaft of the conical gear wheel 11 teeth 12 are provided in engagement with a gear wheel 13, the axle of which is provided with the teeth 14 in engagement with a gear wheel 15. This latter wheel drives the shaft 16, provided with the teeth 17 in engagement with the teeth of the rack bar 2 of the hoisting jack. To the frame of the car box, supports 18 are attached which are adapted to rest upon corresponding studs or axles upon the vehicle frame itself. To the supports 18 hooks 20 and clamping means 21 are secured by which means the supports may be securely and rotatably connected to the studs or axles 19. The gear casing 5 is pivotally secured upon the frame of the vehicle, by means of tubular journals 30 so as to be rotatable on the driving shaft 6 and which extends into the casing through one of the journals with its end in operative engagement with the hoisting gear.

While I have described my invention with reference to a preferred form of construction, I wish it to be understood that I am not limited thereto, the invention being susceptible of such changes and modifications as will suggest themselves to the expert to adapt it for its various uses and applications and without deviating from the spirit of my invention.

I claim:—

1. Dumping wagon comprising in combination, a vehicle frame, a car box tiltably mounted on said frame, a hoisting device on said frame below and engageable with said car box and a driving shaft extending in parallel with the longitudinal axis of said wagon, said hoisting device being in operative engagement with said shaft and arranged to rock about the same.

2. Dumping wagon comprising in combination, a vehicle frame, a car box tiltably mounted on said frame, a toothed gear and rack hoisting device on said frame below and engageable with said car box and a driving shaft extending in parallel with the longitudinal axis of said wagon, said hoisting device being in operative engagement with said shaft and arranged to rock about the same.

3. Dumping wagon comprising in combination, a vehicle frame, a car box tiltably mounted on said frame, a toothed gear and rack hoisting device on said frame below and engageable with said car box, a casing surrounding said hoisting device and serving as a support for said toothed gear and a driving-shaft extending in parallel with the longitudinal axis of said wagon into said casing with its end in operative engagement with said toothed gear, said casing and hoisting device being arranged to rock about said shaft.

4. Dumping wagon comprising in combination, a vehicle frame, a car box tiltably mounted on said frame, a toothed gear and rack hoisting device on said frame below and engageable with said car box, a casing surrounding said hoisting device and serving as a support for said toothed gear, journals extending on opposite sides of said casing and mounted on said frame for rocking motion and a shaft extending in the longitudinal axis of said wagon axially through one of said journals with its end in operative engagement with said toothed gear.

In testimony whereof I affix my signature.

OTTO BALLERT.